Figure 1:
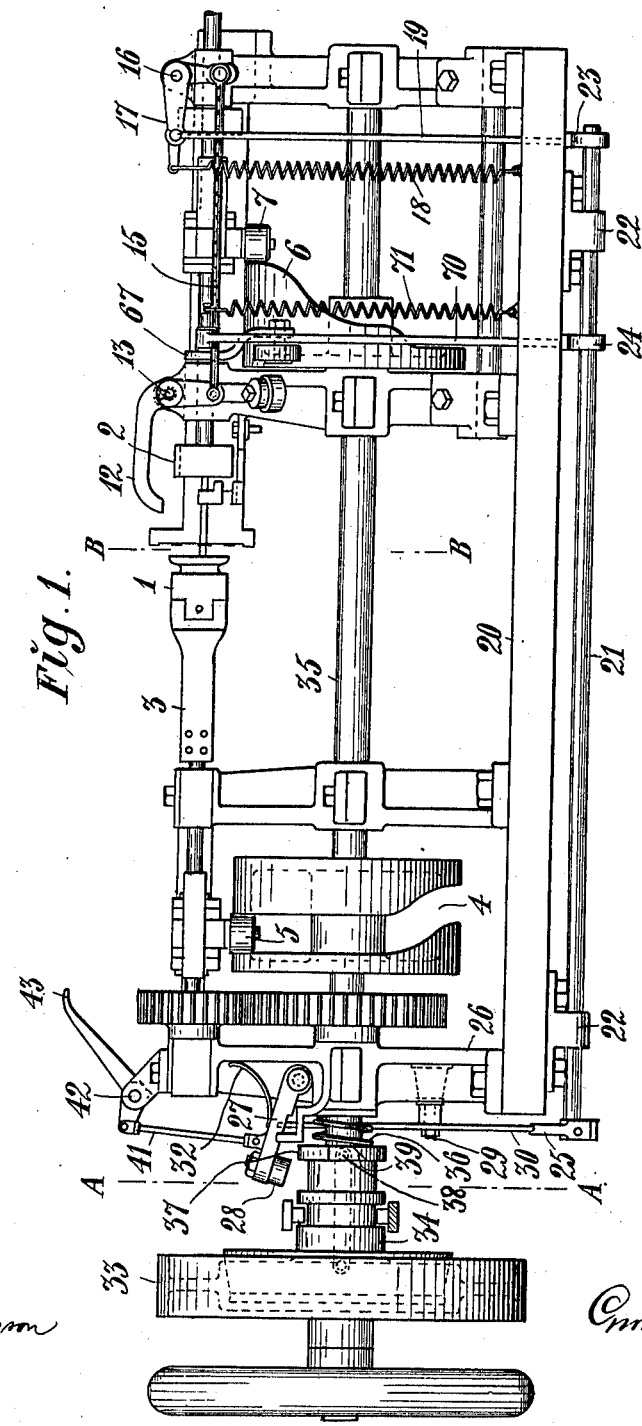

G. OLSSON.
MACHINE FOR MANUFACTURING MATCH BOXES.
APPLICATION FILED APR. 18, 1910.

980,120.

Patented Dec. 27, 1910.
5 SHEETS—SHEET 1.

G. OLSSON.
MACHINE FOR MANUFACTURING MATCH BOXES.
APPLICATION FILED APR. 18, 1910.

980,120.

Patented Dec. 27, 1910.
5 SHEETS—SHEET 2.

G. OLSSON.
MACHINE FOR MANUFACTURING MATCH BOXES.
APPLICATION FILED APR. 18, 1910.

980,120.

Patented Dec. 27, 1910.

5 SHEETS—SHEET 3.

(A-A)

Witnesses

Inventor

G. OLSSON.
MACHINE FOR MANUFACTURING MATCH BOXES.
APPLICATION FILED APR. 18, 1910.

980,120.

Patented Dec. 27, 1910.
5 SHEETS—SHEET 4.

Witnesses

Inventor

G. OLSSON.
MACHINE FOR MANUFACTURING MATCH BOXES.
APPLICATION FILED APR. 18, 1910.
980,120.
Patented Dec. 27, 1910.
5 SHEETS—SHEET 5.
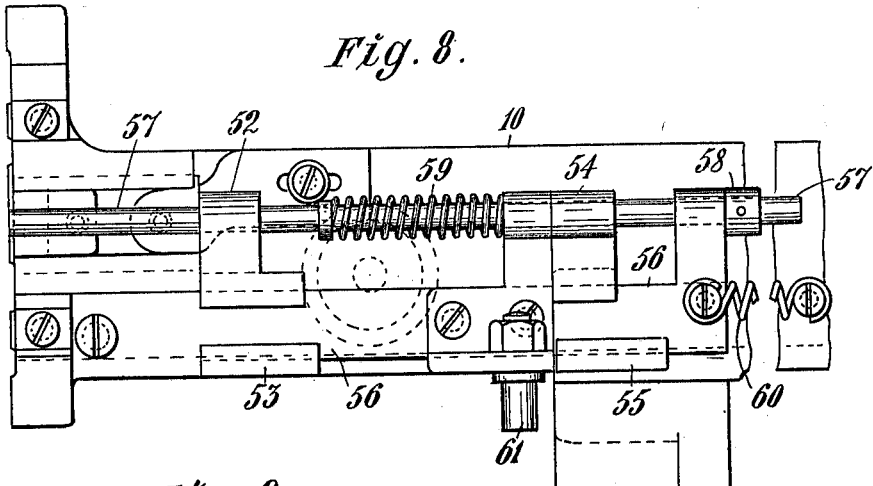
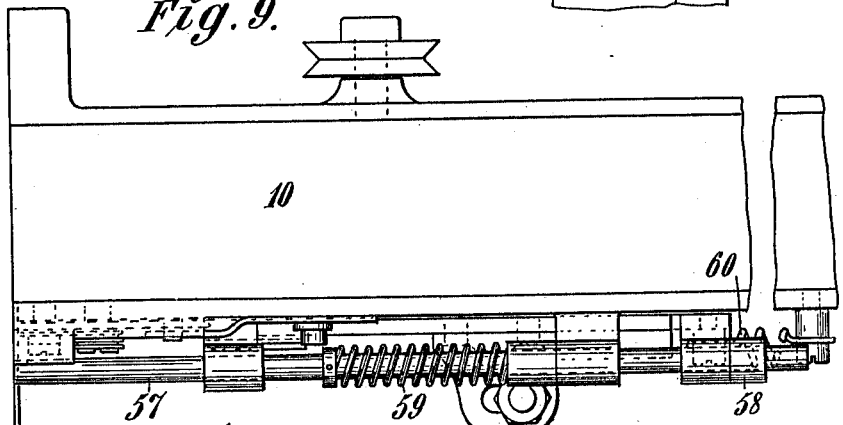
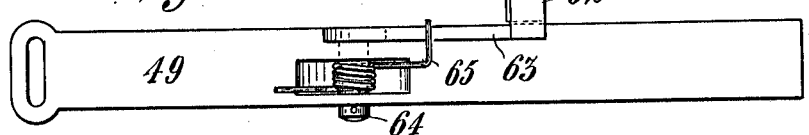
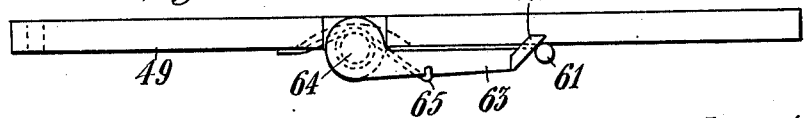
Witnesses
Inventor

UNITED STATES PATENT OFFICE.

GUSTAF OLSSON, OF JÖNKÖPING, SWEDEN, ASSIGNOR TO JÖNKÖPINGS & VULCANS TÄNDSTICKSFABRIKSAKTIEBOLAG, OF JÖNKÖPING, SWEDEN.

MACHINE FOR MANUFACTURING MATCH-BOXES.

980,120.  Specification of Letters Patent.  Patented Dec. 27, 1910.

Application filed April 18, 1910.  Serial No. 556,284.

*To all whom it may concern:*

Be it known that I, GUSTAF OLSSON, a subject of the King of Sweden, residing at Jönköping, in the Kingdom of Sweden, have invented new and useful Improvements in Machines for Manufacturing Match-Boxes and the Like, of which the following is a specification, reference being had to the drawings accompanying and forming a part hereof.

This invention relates to machines for manufacturing match boxes and the like.

In machines for manufacturing match boxes and the like an electrically or mechanically operated device has been employed for automatically stopping the machine, if, for some reason, a box becomes imperfect or if the material for the boxes runs short. These electrical stopping devices are, however, not quite reliable, and the mechanical stopping devices hitherto constructed are complicated in construction and easily get out of order.

The object of this invention is to provide a mechanical stopping device which is simple in construction and reliable in operation.

The invention consists, chiefly, in that the part of the box blank forming the sides of the box, after having been placed on the mandrel on which the boxes are produced, forms a support for a swingable arm or the like mechanically connected to a disconnecting device of the machine in such a manner that the said device is operated and the machine is caused to stop if no box side or an imperfect one is moved onto the mandrel and on account thereof the arm is not supported by the box-side. This arrangement may be employed both for machines for producing inner and outer boxes.

The invention further comprises the construction and combination of parts hereinafter more particularly described.

In the drawings, I have shown, by way of example, a machine for manufacturing inner boxes for matches, said machine being provided with an automatic stopping device embodying the invention.

Figure 2:
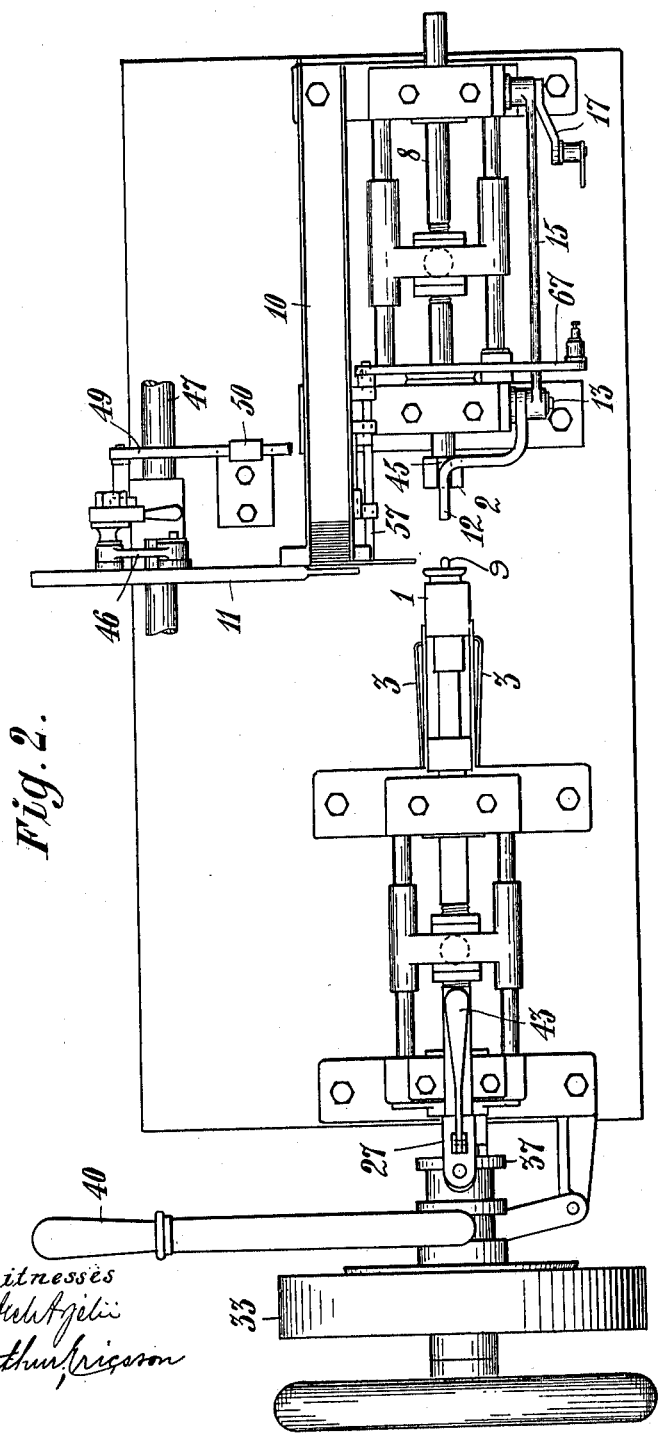
Figure 3:
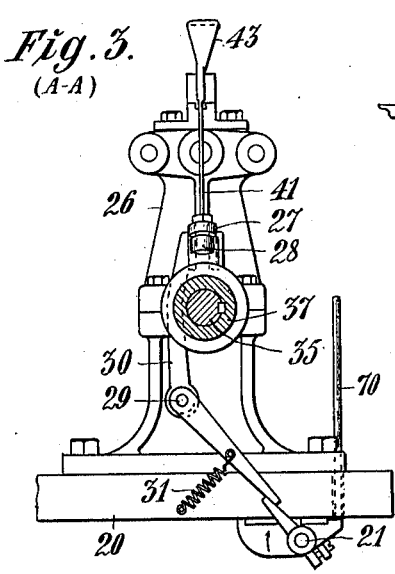
Figure 4:
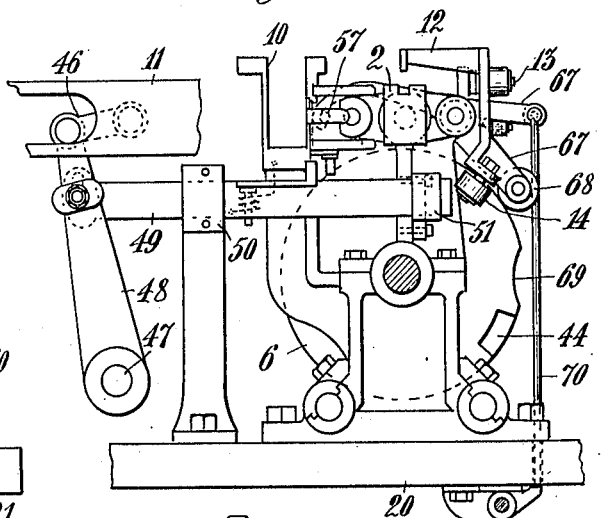
Figure 7:
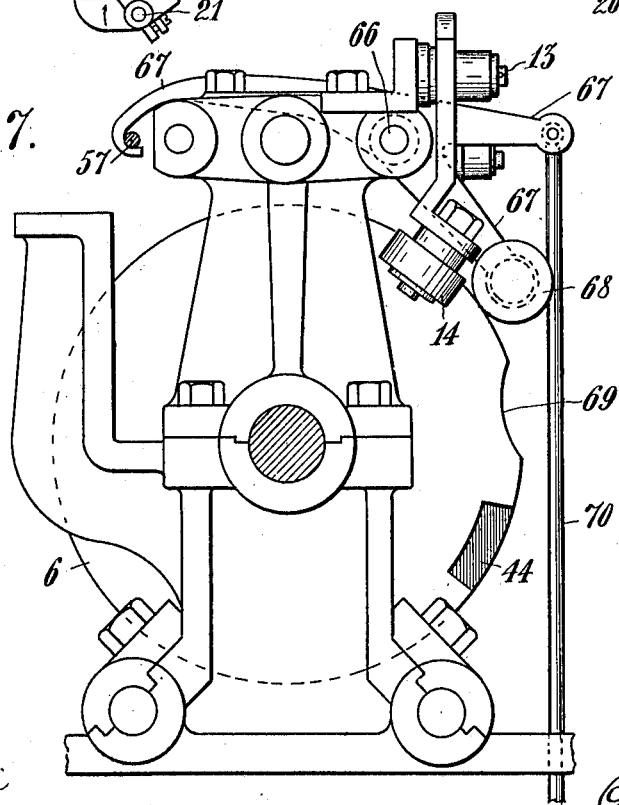

Figure 1 is a side-view of the said machine. Fig. 2 shows the same machine viewed from above. Fig. 3 is a section on line A—A of Fig. 1, and Fig. 4 is a section on line B—B of Fig. 1. Figs. 5–11 show on an enlarged scale details appertaining to the machine.

Referring to the drawings, 1 and 2 designate the two mandrels on which the boxes are produced. The mandrel 1 on which the sides of the box are wound to this end rotates either continuously or intermittently while the mandrel 2 on which the bottom of the box is attached and onto which the half ready box is therefore slid from the mandrel 1, is adapted to move toward and away from the mandrel 1. The sliding movement of the boxes from the mandrel 1 onto the mandrel 2 is performed by means of the springs 3 which are moved by means of a roller 5 engaging the cam groove 4. The mandrel 2 is reciprocated by a cam 6 acting on a roller 7 attached to the axle 8 of the mandrel 2 and by a spring, not shown in the drawing, which keeps the roller 7 pressed against the cam. Inserted in usual manner in the side of the mandrel 1 adjacent to the mandrel 2 is a springy pin 9 serving to hold the box bottoms against the mandrel 2, said bottoms being supplied from the magazine 10 by the slide 11.

Figure 5:
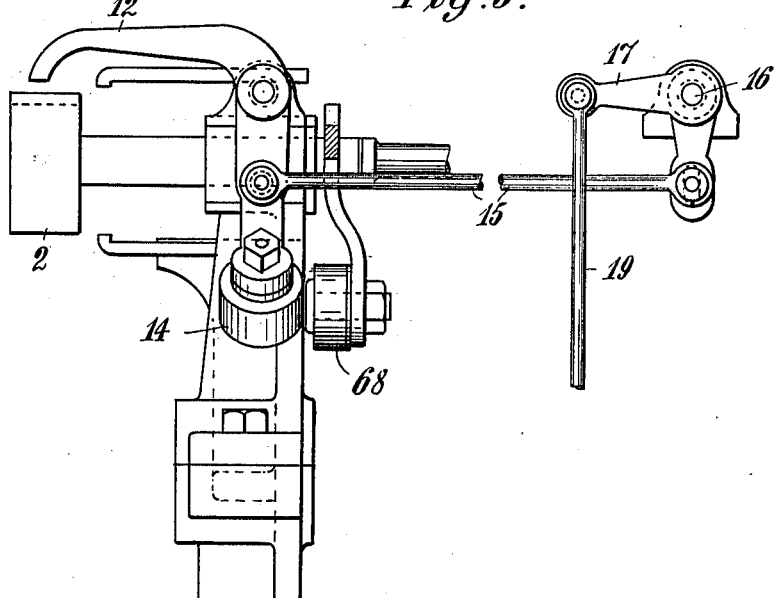
Figure 6:
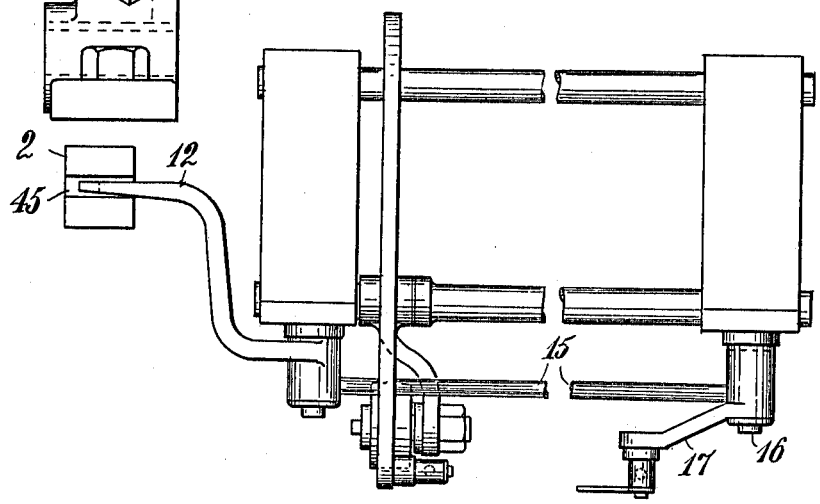

Supported in the machine frame, above the mandrel 2, is an angle lever 12 adapted to swing about the pin 13 and the free end of which is bent downward toward the mandrel 2, as shown by Figs. 1 and 5. The lever 12 at its opposite end carries a roller 14 running on the cam 6. One end of a rod 15 is attached to the lever 12 and the other end is attached to a lever 17 adapted to swing about the pin 16. Attached to this angle lever, which is actuated by a spiral spring 18, is a rod 19 extending downwardly into and guided within an opening in the base-plate 20 of the machine.

Journaled beneath the base-plate 20 is a shaft 21 carried by the bearings 22. Attached to the said shaft are three arms 23, 24 and 25 of which the arm 23 is adapted to be actuated by the rod 19 while the arm 25 actuates the disconnecting device of the machine. Said device consists of an arm 27 journaled in the bracket 26 and adapted to swing in a vertical plane, said arm carrying at its outer free end a roller 28. During normal working of the machine the arm 27 is kept raised in the position shown in Fig. 1 by means of a double-armed lever 30 adapted to swing about the pin 29, said lever having at its upper end a notch in which the arm 27 rests. The lower end of the lever 30 is kept pressed against the arm 25 by means of a spiral spring 31 which thus at the same time serves to turn the shaft 21 so far that the arms 23 and 24 bear on the underside of the base-plate 20. When the arms 23 and 24 bear on the base-plate, the arm 27 is kept raised by the lever 30. If desired, the arm 27 is further actuated by a spring 32 tending to turn the same downward.

The machine is provided with a friction clutch 33 one member 34 of which is movable along the main shaft 35 of the machine. The clutch member 34 is actuated by a spring 36 tending to keep the same in engagement with the other clutch member and is provided with an outwardly projecting flange 37. This flange has a notch 38 one side of which is obliquely cut, as shown in Fig. 1. A lever 40 serves to connect and disconnect the clutch by hand. Pivotally attached to the arm 27 is the one end of a link-rod 41 the other end of which is attached to a lever 43 adapted to turn about the pivot 42. This device serves to raise the arm 27 with the roller 28 out of engagement with the notch in the flange 37 when the machine is to be again started after it has been stopped by the automatic stopping device.

The manner of working of the described device is shortly the following: During its movement away from the mandrel 1 the mandrel 2 stops below the arm 12. If a box blank has now been moved into proper position on the mandrel 2 the arm 12 will rest against the box blank and as a result the roller 14 passes over the notch 44 at the front side of the cam 6 without entering the same. If, on the contrary, no box blank has been moved onto the mandrel 2, the arm 12 under the action of the spring 18 enters into the groove 45 in the mandrel 2, and as a result the roller 14 in passing the notch 44 drops into the same. Hereby the angle levers 12 and 17 connected to each other are turned so that the rod 19 is moved downward in Fig. 1, actuates the arm 23 and turns the shaft 21 in the direction shown by the arrow in Fig. 3. The arm 25 attached to the shaft 21 then by overcoming the resistance of the spring 31 in its turn swings the lever 30 so that the arm 27 loses the support of its upper end and drops down under the influence of its own weight and of the spring 32. The roller 28 will then bear on the flange 37 and in passing the notch 38 drops into the same and by acting on the oblique surface 39 moves the clutch member 34 away from the other clutch member toward the right in Fig. 1 so that the clutch is disconnected and the machine is caused to stop. The stopping of the machine is also effected in case the slide 11 does not supply any box bottom from the magazine 10 or if the supplied bottom is imperfect, for instance has a large hole after a twig or the like. The slide 11 is reciprocated by the connecting-rod 46 and the arm 48 attached to the shaft 47. Attached to the arm 48 is a rod 49 movable in its longitudinal direction in two bearings 50 and 51.

Attached at the side of the magazine 10 for the box bottoms are four guide pieces 52, 53, 54 and 55 (Fig. 8) in which the slide 56 is movable. Journaled in the upper part of the slide is an actuating rod 57 normally held in the position shown in relation to the slide 56 by means of a stop ring 58 and a spiral spring 59 placed about the actuating rod. The slide 56 is kept pressed against the guide piece 54 by a spiral spring 60. Attached to the lower side of the slide 56 is a pin 61 adapted to coöperate with a shoulder 62 on an arm 63 pivoted about the pin 64 on the rod 49. The arm 63 is actuated by a spiral spring 65 tending to keep the same pressed against the rod 49.

Catching about the rearwardly (toward the right in Fig. 8) projecting end of the actuating rod 57 is the one bent part of a three-part arm 67 adapted to turn about the pivot 66. Journaled in the other part of the arm 67 is a roller 68 bearing on the circumference of the cam 6 in which there is a notch 69. The third part of the arm 67 is, finally, connected to the rod 70 which is guided in the same manner as the rod 19 in an opening in the base plate 20 of the machine and bears with its lower end on the arm 24 attached to the shaft 21.

When the slide 11 is to advance (toward the mandrel 2) with a bottom, also the rod 49 moves in the same direction. The shoulder 62 of the arm 63 then engages the pin 61 and thereby causes the slide 56 to advance toward the slide 11. If the slide has now carried with it a perfect bottom from the magazine, the actuating rod 57 will bear with its end on the bottom and thus cannot move. Its rear end therefore still maintains its engagement with the arm 67 while the roller 68 passes over the notch 69 without dropping into the same. If, on the contrary, the slide 11 has brought with it no bottom or an imperfect one, for instance a bottom having a large hole after a twig, the actuating rod obtains no support from the chip but enters into a slot in the slide 11. Hereby the arm 67 loses its engagement with the rear end of the actuating rod 57 and as a consequence the roller 68 in passing the notch 69 drops into the same under the influence of the spiral spring 71. The rod 70 is hereby moved downward and turns the shaft 21 so that the clutch is disconnected in the manner hereinbefore described and the machine is brought to a standstill. When the slide 11 and thereby also the rod 49 moves backward, the pin 61 moves away the arm 63 so that the actuating rod 57 will not be advanced toward the slide 11.

I claim:

1. In a machine for manufacturing match boxes, the combination of a mandrel, means for supplying box blanks to the said mandrel, a movable part supported near the said mandrel in such a manner as to be able to engage the same if no box-side has been placed thereon, means for normally keeping the said part away from the mandrel but allowing it to engage the same, or the blank thereon, in a certain period of working, a disconnecting device for the machine, and mechanical connections between the said movable part and the disconnecting device for operating the latter and thereby disconnecting the machine when the said part, after being released, does not meet a box blank.

2. In a machine for manufacturing match boxes, the combination of a mandrel, means for supplying box blanks to the said mandrel, a swingable arm supported near the said mandrel in such a manner as to be able to engage the said mandrel if no box-side has been placed thereon, means for normally keeping the said arm swung away from the mandrel but allowing it to engage the mandrel, or the blank thereon, in a certain period of working, a disconnecting device for the machine, and mechanical connections between the swingable arm and the said disconnecting device for operating the latter and thereby disconnecting the machine when the said arm, after being released, does not meet a box blank.

3. In a machine for manufacturing match boxes, the combination of a mandrel having a notch, means for supplying box blanks to the said mandrel, an angle lever pivotally supported near the said mandrel in such a manner as to be capable of entering with one end into the notch of the mandrel if no box-side has been placed thereon, means for normally keeping the angle lever swung away from the mandrel but allowing it to engage the said mandrel, or the blank thereon, in a certain period of working, a disconnecting device for the machine, and mechanical connections between the angle lever and the disconnecting device for disconnecting the machine when the end of the lever enters into the notch in the mandrel.

4. In a machine for manufacturing match boxes, the combination of a mandrel having a notch, means for supplying box blanks to the said mandrel, an angle lever pivotally supported near the said mandrel in such a manner as to be capable of entering with one end into the notch of the mandrel if no box-side has been placed thereon, a cam which normally keeps the angle lever swung away from the mandrel but allows the said lever to engage the mandrel, or the blank thereon, in a certain position of the cam, a disconnecting device for the machine, and mechanical connections between the angle lever and the disconnecting device for disconnecting the machine when the end of the lever enters into the notch in the mandrel.

5. In a machine for manufacturing match boxes, the combination of a mandrel having a notch, means for supplying box blanks to the said mandrel, an angle lever pivotally supported near the said mandrel in such a manner as to be capable of entering with one end into the notch of the mandrel if no box-side has been placed thereon, a disconnecting device for the machine, a rocking shaft, arms attached to the said shaft, connections between the angle lever and one of the said arms for turning the shaft when the end of the lever enters into the notch in the mandrel, and connections between another arm of the rocking shaft and the disconnecting device for operating the latter when the shaft is rocked.

6. In a machine for manufacturing match boxes, the combination of a mandrel, means for supplying box-sides to the said mandrel, a slide for supplying box-bottoms to the same, a lever adapted to bear on the box-side placed on the mandrel and adapted to swing, in a certain period of working, if the same is not supported by the box-side, a rod movable toward and away from the bottom-supplying slide, a lever adapted to be engaged by the said slide, when bearing on a box-bottom, and adapted to swing, when disengaged, in a certain direction, a disconnecting device for the machine, a rocking shaft, arms attached to the said shaft, connections between the levers and two of the said arms for rocking the shaft when a lever swings, and connections between a third arm of the rocking shaft and the disconnecting device for operating the latter when the shaft is rocked.

7. In a machine for manufacturing match boxes, the combination of a mandrel, means for supplying box blanks to the said mandrel, a swingable arm adapted to bear on the box-side placed on the mandrel and adapted to swing, in a certain period of working, if the same is not supported, by a box-side, a motion-transmitting clutch comprising an axially movable member having an oblique surface, a rocking shaft, arms attached to the said shaft, connections between the swingable arm and one of the arms of the rocking shaft for turning the latter when the swingable arm is not properly supported by a box-side, a lever adapted to be turned by another arm of the rocking shaft when the latter is turned, a swingable arm adapted to be normally supported by the said lever, and a roller carried by the said arm in such a position as to engage the oblique surface of the axially movable clutch-member and thereby disconnect the clutch when the arm loses the support of the said lever.

8. In a machine for manufacturing match boxes, the combination of a mandrel having a notch, means for supplying box blanks to the said mandrel, an angle lever pivotally supported near the said mandrel in such a manner as to be capable of entering with one end into the notch of the mandrel if no box-side has been placed thereon, a motion-transmitting clutch comprising an axially movable member having an oblique surface, a rocking shaft, arms attached to the said shaft, connections between the angle lever and one of the said arms for turning the said shaft when the angle lever enters into the notch in the mandrel, a lever adapted to be turned by another arm of the rocking shaft when the latter is turned, a swingable arm adapted to be normally supported by the said lever, and a roller carried by the said arm in such a position as to engage the oblique surface of the axially movable cluth-member and thereby disconnect the clutch when the arm loses the support of the said lever.

9. In a machine for manufacturing match boxes, the combination of a mandrel, means for supplying box-sides to the said mandrel, a slide for supplying box-bottoms to the same, a lever adapted to bear on the box-side placed on the mandrel and adapted to swing, in a certain period of working, if the same is not supported by the box-side, a rod movable toward and away from the bottom-supplying slide, a lever adapted to be engaged by the said slide, when bearing on a box-bottom, and adapted to swing, when disengaged, in a certain direction, a motion-transmitting clutch comprising an axially movable member having an oblique surface, a rocking shaft, arms attached to the said shaft, connections between the levers and two of the said arms for turning the said shaft when a lever swings, a lever adapted to be turned by a third arm of the rocking shaft when the latter is turned, a swingable arm adapted to be normally supported by the said lever, and a roller carried by the said arm in such a position as to engage the oblique surface of the axially movable clutch-member and thereby disconnect the clutch when the arm loses the support of the said lever.

GUSTAF OLSSON.

Witnesses:
AXEL AJELII,
ARTHUR ERICSSON.